(12) United States Patent
Schwartz et al.

(10) Patent No.: US 8,911,931 B2
(45) Date of Patent: Dec. 16, 2014

(54) SPIRAL DESIGN GRAPHENE NANORIBBON

(71) Applicant: Lockheed Martin Corporation, Bethesda, MD (US)

(72) Inventors: Rebecca Schwartz, Chester Springs, PA (US); Amulya Garga, Eagleville, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/944,703

(22) Filed: Jul. 17, 2013

(65) Prior Publication Data

US 2014/0023974 A1 Jan. 23, 2014

Related U.S. Application Data

(60) Provisional application No. 61/673,180, filed on Jul. 18, 2012.

(51) Int. Cl.
*G03F 7/26* (2006.01)
*C01B 31/04* (2006.01)

(52) U.S. Cl.
CPC .................................. *C01B 31/0484* (2013.01)
USPC ......................................................... 430/322

(58) Field of Classification Search
CPC ............... H01L 29/1606; H01L 21/02628; H01L 21/306; H01L 21/3065; H01L 21/02282; H01L 21/02603; H01L 29/413; H01L 51/0048; H01L 51/0045; H01L 21/02664; H01L 21/02376; H01L 21/02422; H01L 21/02425; H01L 51/0005; H01L 51/0016; B82Y 40/00; B82Y 30/00; C01B 2204/02; C01B 31/0476; C01B 31/0469; C01B 31/0423; C01B 31/0446; C01B 31/043; C01B 2204/06; C01B 31/0438

USPC ............................................... 430/322, 311, 9
See application file for complete search history.

(56) References Cited

U.S. PATENT DOCUMENTS

| | | | |
|---|---|---|---|
| 8,029,964 B1 * | 10/2011 | Almanza-Workman et al. | 430/117.1 |
| 2003/0179557 A1 | 9/2003 | Berg | |
| 2004/0008300 A1 | 1/2004 | Maeda et al. | |
| 2006/0099750 A1 | 5/2006 | DeHeer et al. | |
| 2008/0149274 A1 | 6/2008 | Suzuki | |
| 2008/0182398 A1 | 7/2008 | Carpenter et al. | |
| 2010/0327956 A1 * | 12/2010 | Karkkainen et al. | 327/530 |
| 2011/0097258 A1 | 4/2011 | Lee et al. | |
| 2011/0121423 A1 | 5/2011 | Forsyth et al. | |
| 2011/0180478 A1 | 7/2011 | Shah et al. | |
| 2011/0244661 A1 | 10/2011 | Dai et al. | |
| 2011/0287316 A1 | 11/2011 | Lu et al. | |
| 2012/0152725 A1 | 6/2012 | Barker et al. | |

* cited by examiner

*Primary Examiner* — Caleen Sullivan
(74) *Attorney, Agent, or Firm* — Marsh Fischmann & Breyfogle LLP (57) ABSTRACT

Graphene nanoribbons and methods for fabricating graphene nanoribbons, particularly those with long lengths, are provided. In one embodiment, a method (400) for fabricating a graphene nanoribbon (100) includes preparing (410) a mask for application on a substrate (102). The mask may include a continuous line of masking material spiraling outward from a first end (104) of the line to a second end (106). The method (400) also includes depositing (420) a graphene layer (108) over a top surface (102A) of the substrate (102), applying (430) the mask to the substrate (102) over the graphene layer (108), removing (440) an unmasked portion of the graphene layer (108), and removing (450) the masking material from a remaining portion of the graphene layer (108) to leave a continuous line of graphene on the surface (102A) of the substrate (100) corresponding with the mask.

20 Claims, 9 Drawing Sheets

SPIRAL DESIGN GRAPHENE NANORIBBON

RELATED APPLICATION INFORMATION

This application claims priority from U.S. Provisional Application Ser. No. 61/673,180, entitled "SPIRAL DESIGN GRAPHENE NANORIBBON" filed on Jul. 18, 2012, which is incorporated by reference herein in its entirety.

FIELD OF THE INVENTION

The present invention relates generally to graphene nanoribbons (GNRs), and more particularly to fabricating long GNRs.

BACKGROUND OF THE INVENTION

Graphene is generally understood to be a pure carbon substance that is an allotrope of carbon whose structure is a single planar sheet of $sp^2$-bonded carbon atoms packed in a honeycomb crystal lattice structure. Graphene nanoribbons (GNRs) are ultra-thin lines of graphene. Since graphene exhibits properties such as high carrier mobility, GNRs have been considered for use in high-performance electronic devices, including devices requiring particularly long electrical conductors (e.g., with lengths of one mile or longer). One manner of fabricating GNRs is unzipping carbon nanotubes. However, given their ultra-thin nature, obtaining particularly long GNRs in this manner without encountering breaks, cracks or other discontinuities has proven challenging.

SUMMARY OF THE INVENTION

Accordingly, GNRs and methods for fabricating GNRs are provided. While applicable to the fabrication of any length GNRs, the fabrication methods described herein are particularly useful in fabricating long GNRs (e.g., with lengths of one mile or longer).

In one aspect, a method for fabricating a graphene nanoribbon may include preparing a mask for application on a substrate. The mask that is prepared may include a continuous line of masking material spiraling outward from a first end of the line to a second end of the line. The method may also include depositing a graphene layer over a surface of the substrate. The method may also include applying the mask to the substrate over the graphene layer to achieve a masked portion of the graphene layer. The method may also include removing an unmasked portion of the graphene layer from the surface of the substrate. The method may also include removing the masking material from a remaining portion of the graphene layer to leave a continuous line of graphene on the surface of the substrate corresponding with the mask.

In another aspect, a graphene nanoribbon may include a substrate and a layer of graphene deposited on a surface of the substrate. A portion of the graphene layer may be removed from the surface of the substrate to form a continuous line of graphene on the surface of the substrate spiraling outward from a first end of the line to a second end of the line.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1A:
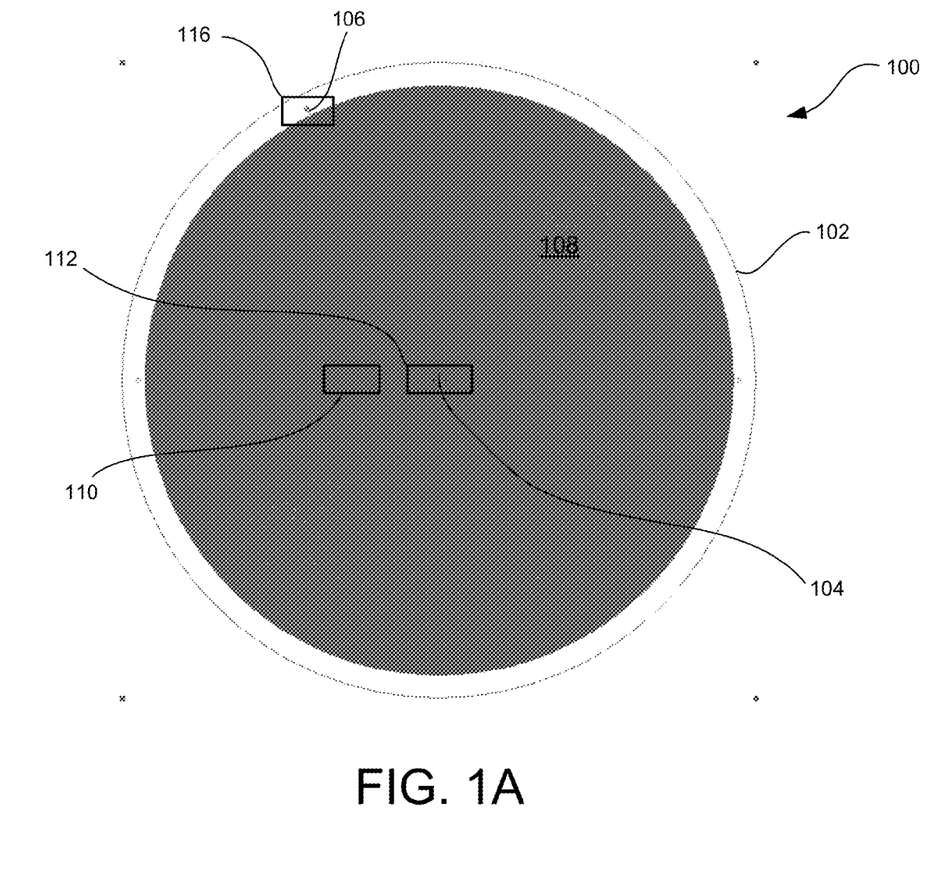
FIGS. 1A-1B are top plan and side edge views of one embodiment of a graphene nanoribbon formed on a substrate.
Figure 1B:
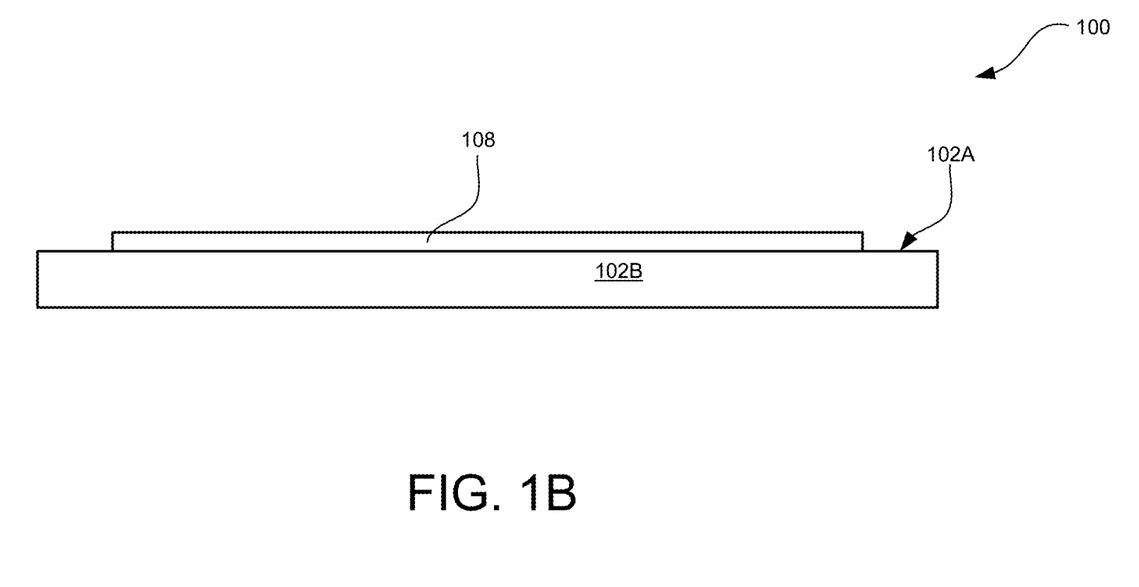

FIGS. 1A and 1B show top plan and side views of one embodiment of spiral design graphene nanoribbon 100. The graphene nanoribbon 100 is formed on a top surface 102A of a substrate 102 from a layer 108 of graphene deposited on the substrate 102 surface. The graphene nanoribbon 100 spirals outward in a continuous line from a first end 104 of the line proximal to a center of the top surface 102A of the substrate 102 to a second end 106 of the line proximal to an outer edge 102B of the substrate 102. The spiraling configuration of the graphene nanoribbon 100 efficiently utilizes the top surface 102A area of the substrate 102 thereby permitting a particularly long graphene nanoribbon 100.

The substrate 102 may, for example, be a ceramic wafer (e.g., a silicon wafer). The ceramic wafer substrate 102 may be appropriately sized to accommodate a desired length of the graphene nanoribbon 100. In this regard, where a desired length of the graphene nanoribbon is 5280 feet or longer, the ceramic wafer substrate 102 may have a diameter of about four inches or larger.

Figure 2:
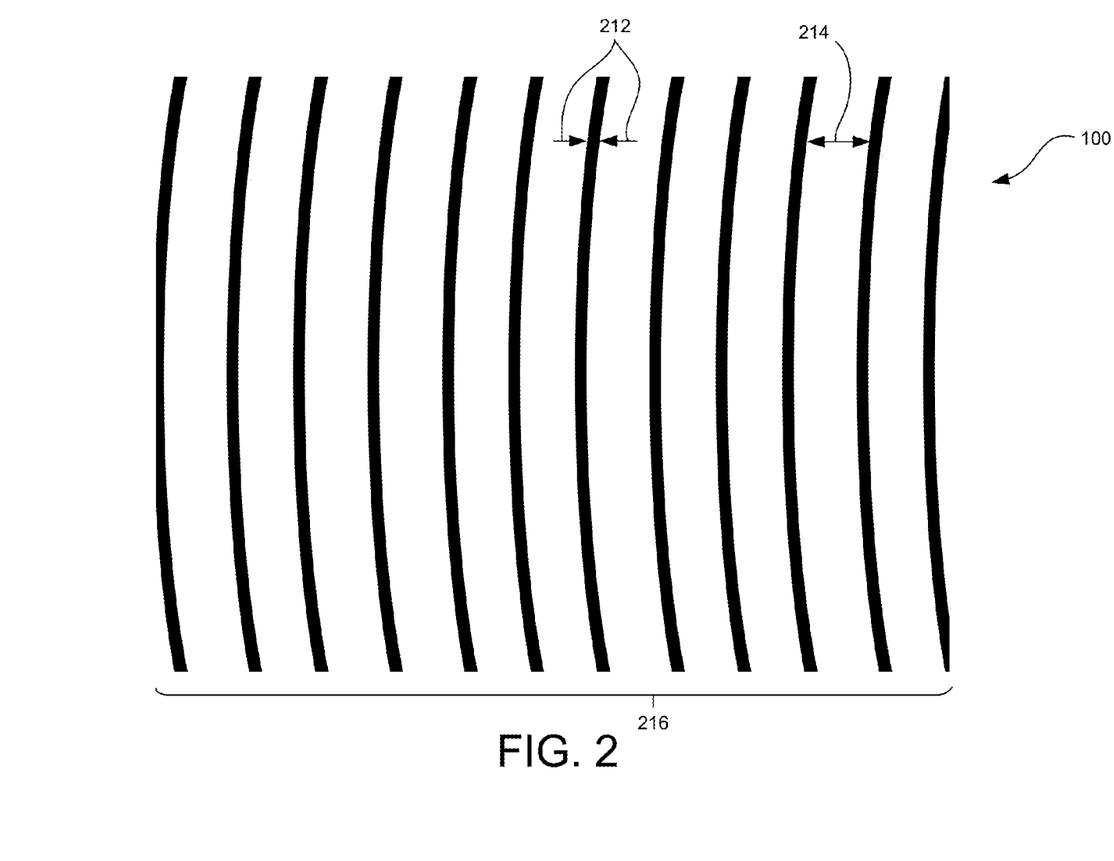
FIG. 2 is an enlarged plan view of a portion of the graphene nanoribbon of FIGS. 1A-1B.

The size of the ceramic wafer substrate 102 needed for a particular length graphene nanoribbon 100 may, in addition to the desired length of the graphene nanoribbon 100, also depend on a width of the graphene nanoribbon 102 and a spacing between concentric arcuate portions of the graphene nanoribbon. In this regard, FIG. 2 shows an enlarged view of a portion of the graphene nanoribbon 100 as identified by box 110 in FIG. 1A. As shown in FIG. 2, the graphene nanoribbon 100 has a width 212 and a spacing 214 is provided between adjacent concentric arcuate portions 216 of the graphene nanoribbon 100. In one embodiment, the width 212 may be 1.10 microns or less and the spacing 214 may be 2.00 microns or less. In embodiments such as depicted, the graphene nanoribbon 100 may be formed with consistent widths 212 and/or spacings 214 over the length of the graphene nanoribbon 100 from the first end 104 thereof to the second end 106 thereof. In other embodiments, the graphene nanoribbon 100 may be formed with widths 212 and/or spacings 214 that vary over the length of the graphene nanoribbon 100 from the first end 104 thereof to the second end 106 thereof.

Figure 3A:
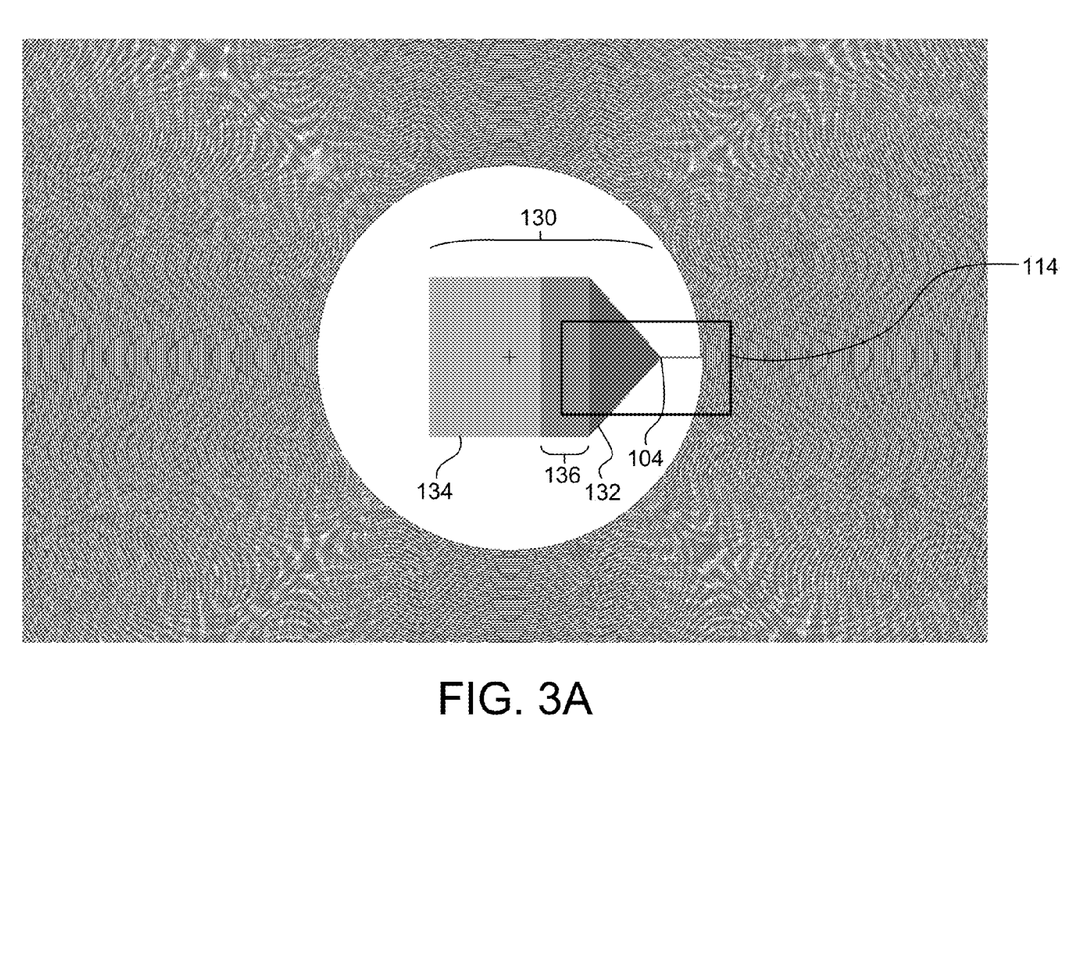
FIGS. 3A-3D are enlarged top plan views of portions of the graphene nanoribbon of FIGS. 1A-1B.
Figure 3B:
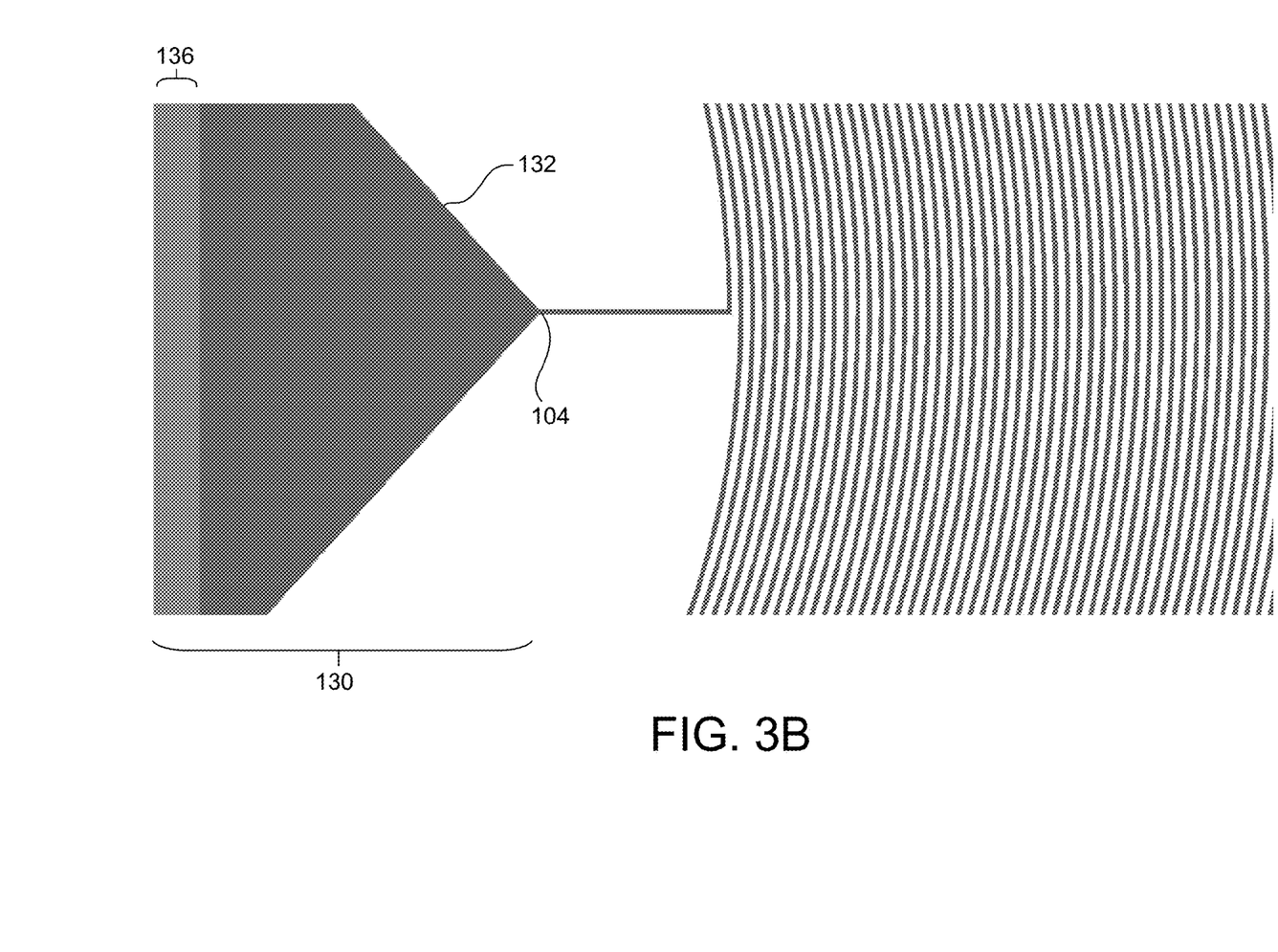
Figure 3C:
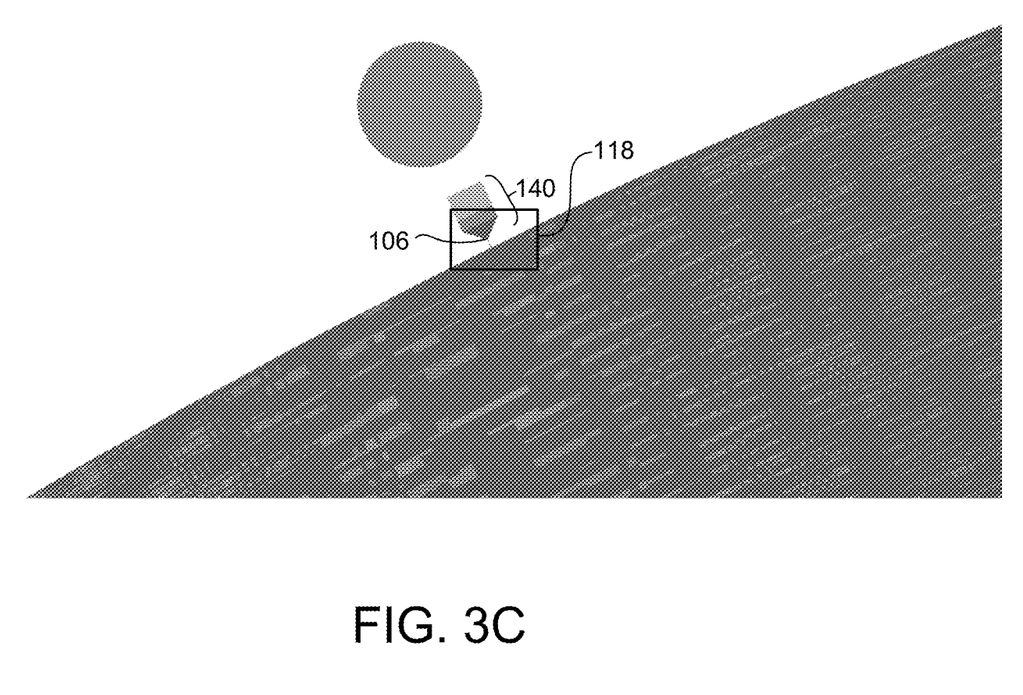
Figure 3D:
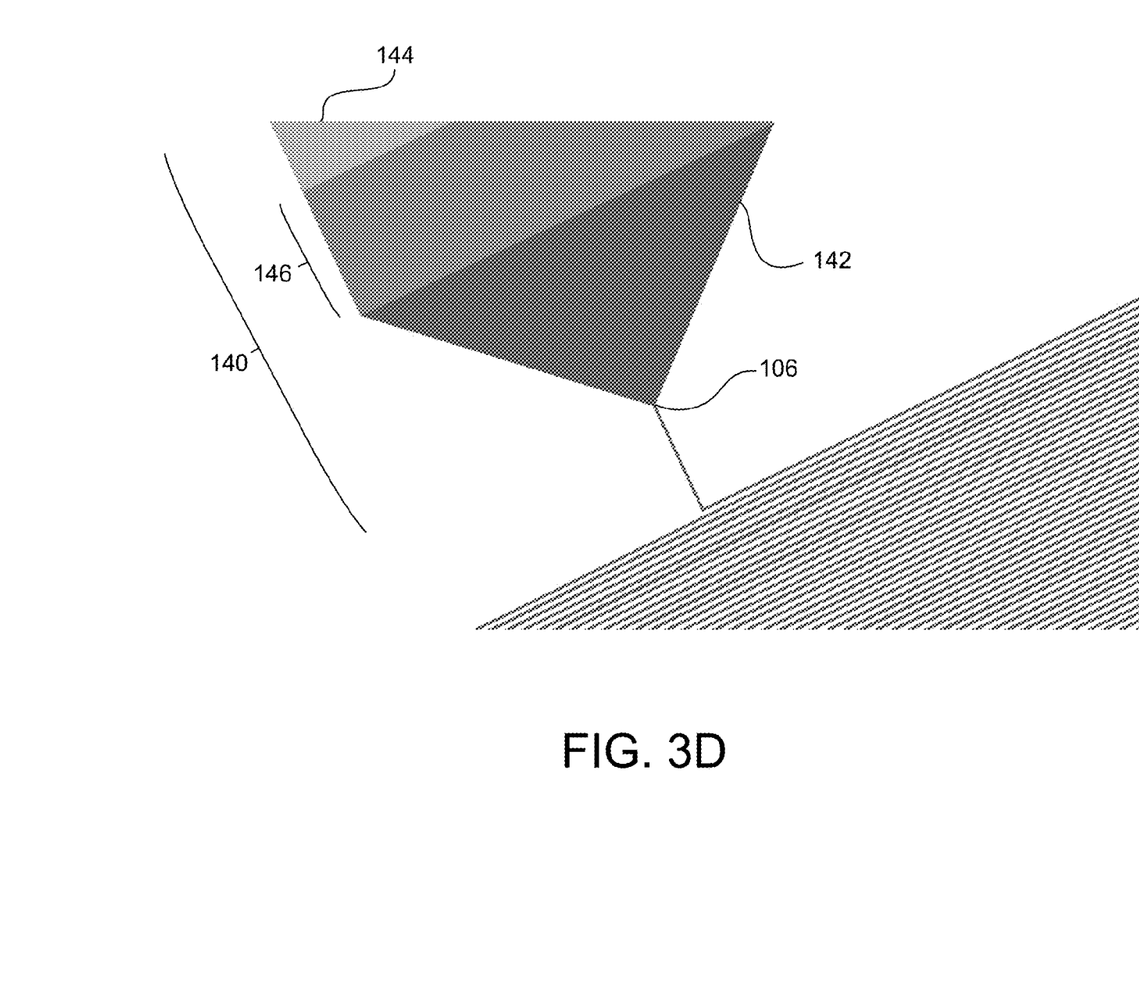

As shown in FIGS. 3A-3D, the graphene nanoribbon 100 may include first and second electrical contact pads 130, 140 formed at respective first and second ends 104, 106. The first and second electrical contact pads 130, 140 facilitate connection of the graphene nanoribbon with other electrical and electronic components by providing convenient locations at which electrical wires and/or electrical leads may be soldered or otherwise affixed. For example, FIG. 3A shows an enlarged view of a portion of the graphene nanoribbon corresponding with box 112 in FIG. 1A, FIG. 3B shows a further enlarged view of a portion of the graphene nanoribbon 100 corresponding with box 114 in FIG. 3A, FIG. 3C shows an enlarged view of a portion of the graphene nanoribbon corresponding with box 116 in FIG. 1A, and FIG. 3D shows a further enlarged view of a portion of the graphene nanoribbon 100 corresponding with box 118 in FIG. 3C. The first electrical contact pad 130 may comprise a first enlarged area 132 of the graphene layer 108 remaining at the first end 104 of the graphene nanoribbon 100. The first enlarged area 132 may be interfaced with a first electrically conductive metallic area 134 deposited on the top surface 102A of the substrate 100 by having coextensive portions 136 of the first enlarged area 132 and the first metallic area 134. The second electrical contact pad 140 may comprise a second enlarged area 142 of the graphene layer 108 remaining at the second end 106 of the graphene nanoribbon 100. The second enlarged area 142 may be interfaced with a second electrically conductive metallic area 144 deposited on the top surface 102A of the substrate 100 by having coextensive portions 136 of the second enlarged portion 132 and the second metallic area 134.

Figure 4:
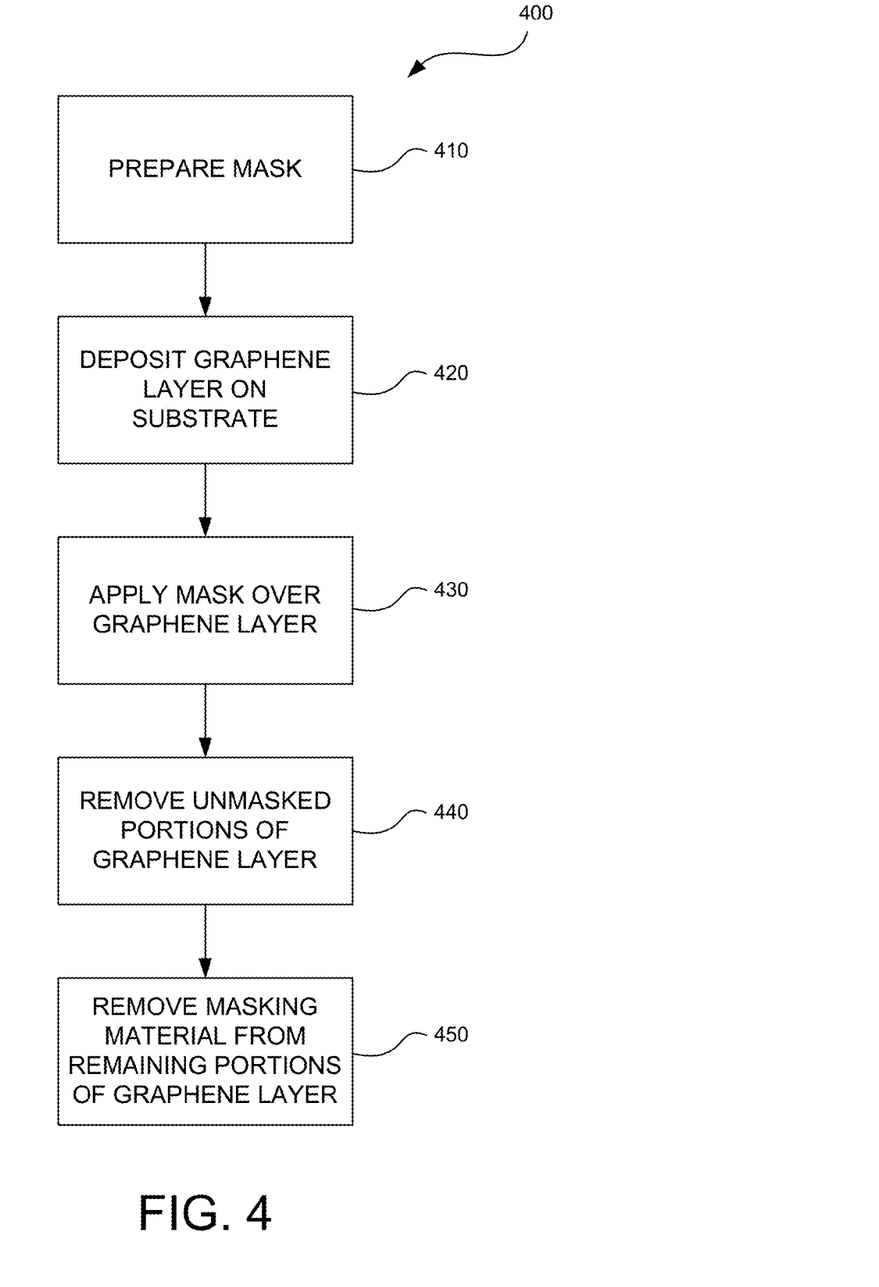
FIG. 4 shows the steps in one embodiment of a method for fabricating a graphene nanoribbon.

FIG. 4 shows the steps that may be included in one embodiment of a method 400 for fabricating a graphene nanoribbon. In step 410 of the method 400, a mask for application on a substrate is prepared. The mask that is prepared in step 400 includes a continuous line of masking material spiraling outward from a first end of the line of masking material to a second end of the line of masking material. The mask may, for example, correspond with the layout of a graphene nanoribbon 100 such as depicted in FIGS. 1A-1B, 2, and 3A-3D. In this regard, the continuous line of masking material may have a desired length between the first and second ends (e.g. about 5280 feet or more), a desired width (e.g., about 1.10 microns or less), a desired spacing between concentric arcuate portions (e.g., about 2.00 microns or less), and/or first and second enlarged areas for forming electrical contact pads adjoining respective first and second ends of the continuous spiral line. The step 410 of preparing the mask may be accomplished in a variety of manners. In one example, the mask may be printed using, for example, a laser printer.

In step 420 of the method 400, a graphene layer is deposited over a top surface of the substrate. The substrate may, for example, be a ceramic substrate such as, for example, a silicon wafer. In this regard, the wafer may be of a diameter (e.g., about 4 inches or larger) sufficient to accommodate a desired length of the spiral design graphene nanoribbon.

Fabrication of the graphene nanoribbon may be completed as described in steps 430, 440 and 450 of the method 400. One or more of steps 430, 440 and 450 may be accomplished using a photolithographic system.

Figure 5:
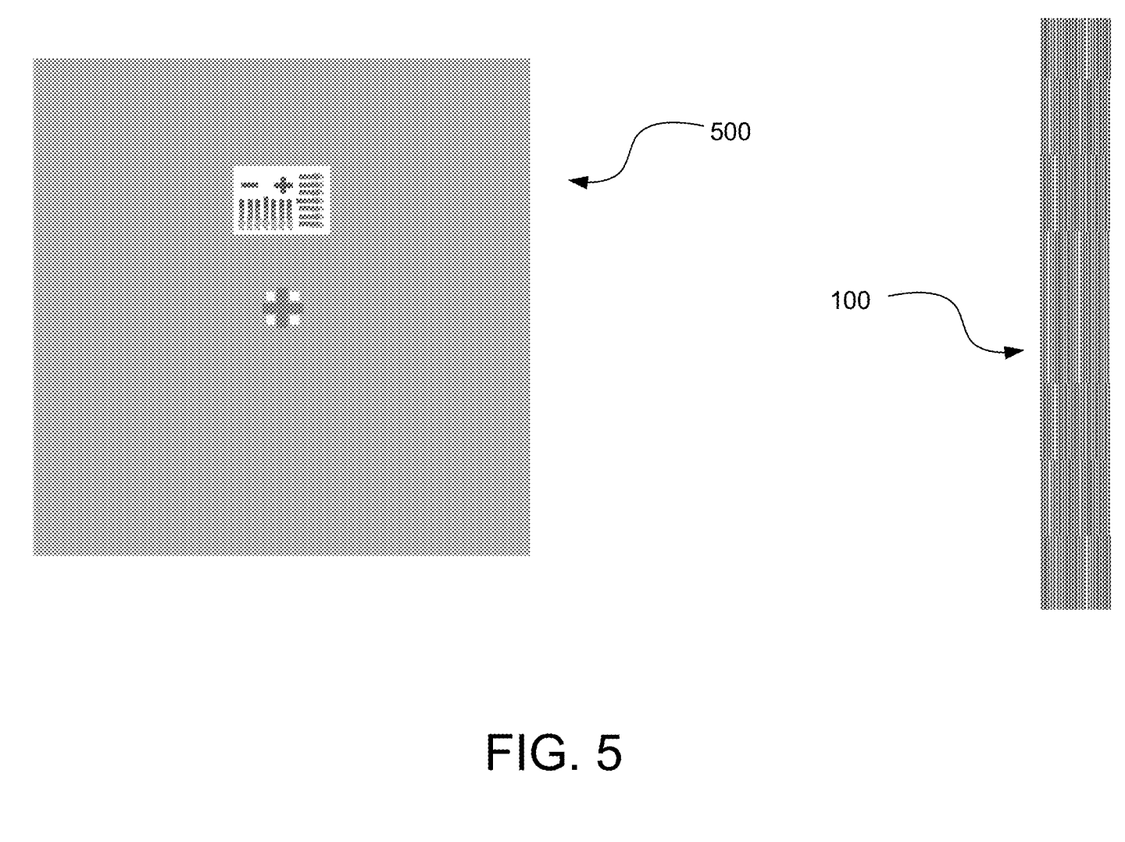
FIG. 5 shows exemplary alignment marks that may be included in a mask used in the fabrication method of FIG. 4.

In step 430 of the method 400, the mask is applied to the substrate over the graphene layer to achieve a masked portion of the graphene layer. To assist in aligning the mask on the substrate, in step 410 of preparing the mask, alignment markers may be included in the mask. FIG. 5 shows exemplary alignment marks 500 that may be included in the mask. The alignment marks 500 may be located in various positions including outside the periphery of the line on the mask corresponding with the graphene nanoribbon 100 such as shown in FIG. 5.

In step 440 of the method 400, an unmasked portion of the graphene layer is removed from the surface of the substrate. In this regard, the substrate may be treated with a first etchant (e.g. a liquid or gas solution) that is substantially non-reactive with the masking material but reacts with graphene to remove the unmasked portions of the graphene layer. After a sufficient amount of the unmasked portion of the graphene layer has been removed from the substrate, the substrate may be washed with an appropriate solution in order to stop further etching of the graphene layer under the masking material.

In step 450 of the method 400, the masking material is removed from the remaining portion of the graphene layer to leave the continuous graphene line and, if included, contact pad areas of graphene on the surface of the substrate corresponding with the mask. In this regard, the substrate may be treated with a second etchant (e.g. a liquid or gas solution) that is substantially non-reactive with the graphene layer but reacts with the masking material to remove the masking material overlying the portions of the graphene layer remaining after step 440. After the masking material has been sufficiently removed, the substrate may be washed with an appropriate solution.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments and/or arrangements can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, the foregoing description has been presented for purposes of illustration and description and is not intended to limit the invention to the form disclosed herein. Consequently, variations and modifications commensurate with the above teachings may be possible. It is intended that the appended claims be construed to include alternative embodiments to the extent permitted by the prior art.

What is claimed is:

1. A method for fabricating a graphene nanoribbon, said method comprising the steps of:
    preparing a mask for application on a substrate, the mask including a continuous line of masking material spiraling outward from a first end of the line to a second end of the line;
    depositing a graphene layer over a surface of the substrate;
    applying the mask to the substrate over the graphene layer to achieve a masked portion of the graphene layer;
    first removing an unmasked portion of the graphene layer from the surface of the substrate; and
    second removing the masking material from a remaining portion of the graphene layer to leave a continuous spiral line of graphene on the surface of the substrate corresponding with the mask.

2. The method of claim 1 wherein said step of preparing the mask comprises printing the mask with a laser printer.

3. The method of claim 1 wherein said steps of applying, first removing and second removing are accomplished using a photolithographic system.

4. The method of claim 1 wherein said step of first removing comprises treating the substrate with a first etchant that is substantially non-reactive with the masking material.

5. The method of claim 1 wherein said step of second removing comprises treating the substrate with a second etchant that is substantially non-reactive with the graphene.

6. The method of claim 1 wherein said step of preparing includes preparing the mask to include a first contact pad area connected to the first end of the continuous spiral line and a second contact pad area connected to the second end of the continuous spiral line.

7. The method of claim 1 wherein in said step of preparing, the continuous spiral line of masking material exceeds more than 5280 feet in length from the first end to the second end.

8. The method of claim 1 wherein in said step of preparing, the continuous line of masking material is about 1.1 microns or less in width.

9. The method of claim 1 wherein in said step of depositing, the substrate comprises a ceramic wafer.

10. The method of claim 9 wherein in said step of depositing, the ceramic wafer has a diameter of about 4 inches or larger.

11. A method for fabricating a graphene nanoribbon, said method comprising the steps of:
preparing a mask for application on a substrate, the mask including a continuous line of masking material spiraling outward from a first end of the line to a second end of the line, wherein concentric arcuate portions of the continuous line of masking material are spaced apart from one another by about 2.0 microns or less;
depositing a graphene layer over a surface of the substrate;
applying the mask to the substrate over the graphene layer to achieve a masked portion of the graphene layer;
first removing an unmasked portion of the graphene layer from the surface of the substrate; and
second removing the masking material from a remaining portion of the graphene layer to leave a continuous spiral line of graphene on the surface of the substrate corresponding with the mask.

12. A graphene nanoribbon comprising:
a substrate; and
a layer of grapheme deposited on a surface of said substrate, wherein a portion of said graphene layer is removed from the surface of the substrate to form a continuous line of graphene on the surface of said substrate spiraling outward from a first end of the line to a second end of the line.

13. The graphene nanoribbon of claim 12 wherein said portion of said graphene layer is removed from the surface of said substrate by:
applying a mask comprised of masking material to said substrate over said graphene layer to achieve a masked portion of said graphene layer, said masked portion corresponding with said continuous spiral line;
first removing an unmasked portion of said graphene layer from the surface of said substrate; and
second removing said masking material from a remaining portion of said graphene layer to leave said continuous spiral line of graphene on the surface of said substrate.

14. The graphene nanoribbon of claim 13 wherein said mask is prepared by printing said mask with a laser printer.

15. The graphene nanoribbon of claim 12 further comprising a first contact pad area formed from said graphene layer and connected to the first end of said continuous spiral line and a second contact pad area formed from said graphene layer and connected to the second end of said continuous spiral line.

16. The graphene nanoribbon of claim 12 wherein said continuous spiral line formed in said graphene layer exceeds more than 5280 feet in length from the first end to the second end.

17. The graphene nanoribbon of claim 12 wherein said continuous spiral line formed in said graphene layer is about 1.1 microns or less in width.

18. The graphene nanoribbon of claim 12 wherein said substrate comprises a ceramic wafer.

19. The graphene nanoribbon of claim 18 wherein said ceramic wafer has a diameter of about 4 inches or larger.

20. A graphene nanoribbon comprising:
a substrate; and
a layer of graphene deposited on surface of said substrate, wherein a portion of said graphene layer is removed from the surface of the substrate to form a continuous line of graphene on the surface of said substrate spiraling outward from a first end of the line to a second end of the line, wherein concentric arcuate portions of said continuous spiral line formed in said graphene layer are spaced apart from one another by about 2.0 microns or less.

* * * * *

UNITED STATES PATENT AND TRADEMARK OFFICE
CERTIFICATE OF CORRECTION

| | |
|---|---|
| PATENT NO. | : 8,911,931 B2 |
| APPLICATION NO. | : 13/944703 |
| DATED | : December 16, 2014 |
| INVENTOR(S) | : Rebecca Schwartz et al. |

It is certified that error appears in the above-identified patent and that said Letters Patent is hereby corrected as shown below:

In the Claims:

In column 5, line 39, claim 12, delete "grapheme", and insert --graphene--.

In column 6, line 34, claim 20, after "deposited", insert --a--.

Signed and Sealed this
Twenty-first Day of April, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 8,911,931 B2 |
| APPLICATION NO. | : 13/944703 |
| DATED | : December 16, 2014 |
| INVENTOR(S) | : Rebecca Schwartz et al. |

It is certified that error appears in the above-identified patent and that said Letters Patent is hereby corrected as shown below:

In the Claims:

In column 5, line 39, claim 12, delete "grapheme", and insert --graphene--.

In column 6, line 34, claim 20, after "deposited on", insert --a--.

This certificate supersedes the Certificate of Correction issued April 21, 2015.

Signed and Sealed this
Ninth Day of June, 2015

Michelle K. Lee
*Director of the United States Patent and Trademark Office*